United States Patent
Katayama (10) Patent No.: US 10,623,600 B2
(45) Date of Patent: Apr. 14, 2020

(54) IMAGE PICKUP APPARATUS, CONTROL METHOD THEREOF, AND RECORDING MEDIUM RELATING TO TRANSFERRING IMAGES TO AN EXTERNAL APPARATUS

(71) Applicant: CANON KABUSHIKI KAISHA, Tokyo (JP)

(72) Inventor: Atsushi Katayama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 30 days.

(21) Appl. No.: 15/898,076

(22) Filed: Feb. 15, 2018

(65) Prior Publication Data

US 2018/0241902 A1    Aug. 23, 2018

(30) Foreign Application Priority Data

Feb. 22, 2017  (JP) ................................ 2017-031501

(51) Int. Cl.
| | | |
|---|---|---|
| H04N 5/232 | (2006.01) | |
| H04N 1/21 | (2006.01) | |
| H04N 1/32 | (2006.01) | |
| H04N 1/00 | (2006.01) | |

(52) U.S. Cl.
CPC ....... *H04N 1/2125* (2013.01); *H04N 1/00095* (2013.01); *H04N 1/32374* (2013.01); *H04N 5/23293* (2013.01); *H04N 2201/0084* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,385,635 B2 * | 6/2008 | Kobayashi | ............. | H04N 5/772 348/222.1 |
| 2002/0067923 A1 * | 6/2002 | Fujimura | ............... | G03B 17/48 396/429 |
| 2002/0191079 A1 * | 12/2002 | Kobayashi | ............. | H04N 5/772 348/207.1 |
| 2005/0151858 A1 * | 7/2005 | Nozaki | ................ | H04N 1/2112 348/231.9 |
| 2010/0157067 A1 * | 6/2010 | Karn | .................. | H04N 1/00204 348/207.1 |

FOREIGN PATENT DOCUMENTS

| | | | |
|---|---|---|---|
| JP | 2010-074239 A | | 4/2010 |
| JP | 2011061818 A | * | 3/2011 |

* cited by examiner

*Primary Examiner* — Gary C Vieaux
(74) *Attorney, Agent, or Firm* — Canon U.S.A., Inc. IP Division (57) ABSTRACT

An image pickup apparatus includes a specifying unit that specifies, as a transfer target, an image to be transferred to an external device from among images recorded in a recording medium, a transfer control unit that controls the specified image to be transferred to the external device, a display control unit that displays a predetermined screen for inputting an instruction for restricting deletion of the image specified as the transfer target, and a restriction unit that associates, in a case where the instruction for restricting the deletion of the image specified as the transfer target is input via the predetermined screen, information for restricting deletion with the image specified as the transfer target after inputting the instruction, and associates the information for restricting the deletion with images previously specified as the transfer target before inputting the instruction.

17 Claims, 9 Drawing Sheets

TRANSFER MANAGEMENT LIST

PROTECTED STATE ☐

IMG_0001:TRANSFER WAITING

FIG. 4B

TRANSFER MANAGEMENT LIST

PROTECTED STATE ☐

IMG_0001:BEING TRANSFERRED

FIG. 4C

TRANSFER MANAGEMENT LIST

PROTECTED STATE ☐

IMG_0001:TRANSFER COMPLETE

FIG. 4D

TRANSFER MANAGEMENT LIST

PROTECTED STATE ☐☐☐

IMG_0001:TRANSFER WAITING
IMG_0002:TRANSFER WAITING
IMG_0003:TRANSFER WAITING

FIG. 4E

TRANSFER MANAGEMENT LIST
                    PROTECTED STATE
IMG_0001:TRANSFER WAITING    [✓]

FIG. 4F

TRANSFER MANAGEMENT LIST
                    PROTECTED STATE
IMG_0001:TRANSFER COMPLETE   [ ]

FIG. 4G

TRANSFER MANAGEMENT LIST
                    PROTECTED STATE
IMG_0001:TRANSFER WAITING    [✓]
IMG_0002:TRANSFER WAITING    [✓]
IMG_0003:TRANSFER WAITING    [✓]

FIG. 4H

TRANSFER MANAGEMENT LIST
                    PROTECTED STATE
IMG_0001:TRANSFER WAITING    [✓]
IMG_0002:TRANSFER WAITING    [✓]
IMG_0003:TRANSFER WAITING    [✓]
IMG_0004:TRANSFER WAITING    [✓]

IMAGE PICKUP APPARATUS, CONTROL METHOD THEREOF, AND RECORDING MEDIUM RELATING TO TRANSFERRING IMAGES TO AN EXTERNAL APPARATUS

BACKGROUND

Field

The present disclosure relates to control to be performed when a captured image is transferred to an external device.

Description of the Related Art

An image pickup apparatus that transfers a captured image to an external device is known. For example, Japanese Patent Application Laid-Open No. 2010-074239 discusses a technique for automatically transferring image data obtained by image capturing to an external apparatus and for selecting the image data to be transferred to the external apparatus by a user's operation. While there is such a system that automatically transfers images, there is also a need for rapidly deleting images previously transferred to the external apparatus to increase a free space in a recording medium.

As described above, in order to meet the need for deleting a transferred content and preventing deletion of a content that is not transferred yet, it is necessary to appropriately manage a status indicating whether a content is already transferred, and to manage a status indicating whether to delete the content. For example, when a content is automatically transferred at a predetermined timing, a user cannot recognize the transfer timing. Therefore, it is necessary to take some measures on the image pickup apparatus side to deal with this issue.

SUMMARY

According to an aspect of the present disclosure, an image pickup apparatus that communicates with an external device and includes a recording unit configured to record images in a recording medium, a specifying unit configured to specify, as a transfer target, an image to be transferred to the external device from among the images recorded in the recording medium, a transfer control unit configured to control the specified image to be transferred to the external device, a display control unit configured to display a predetermined screen for inputting an instruction for restricting deletion of the image specified as the transfer target, and a restriction unit configured to associate, in a case where the instruction for restricting the deletion of the image specified as the transfer target is input via the predetermined screen, information for restricting the deletion with the image specified as the transfer target after the instruction is input, and also associate the information for restricting the deletion with images previously specified as the transfer target before the instruction is input, with the image.

Further features will become apparent from the following description of exemplary embodiments with reference to the attached drawings.

DESCRIPTION OF THE EMBODIMENTS

Exemplary embodiments will be described in detail below with reference to the accompanying drawings.

<Configuration of Image Pickup Apparatus>

Figure 1A:
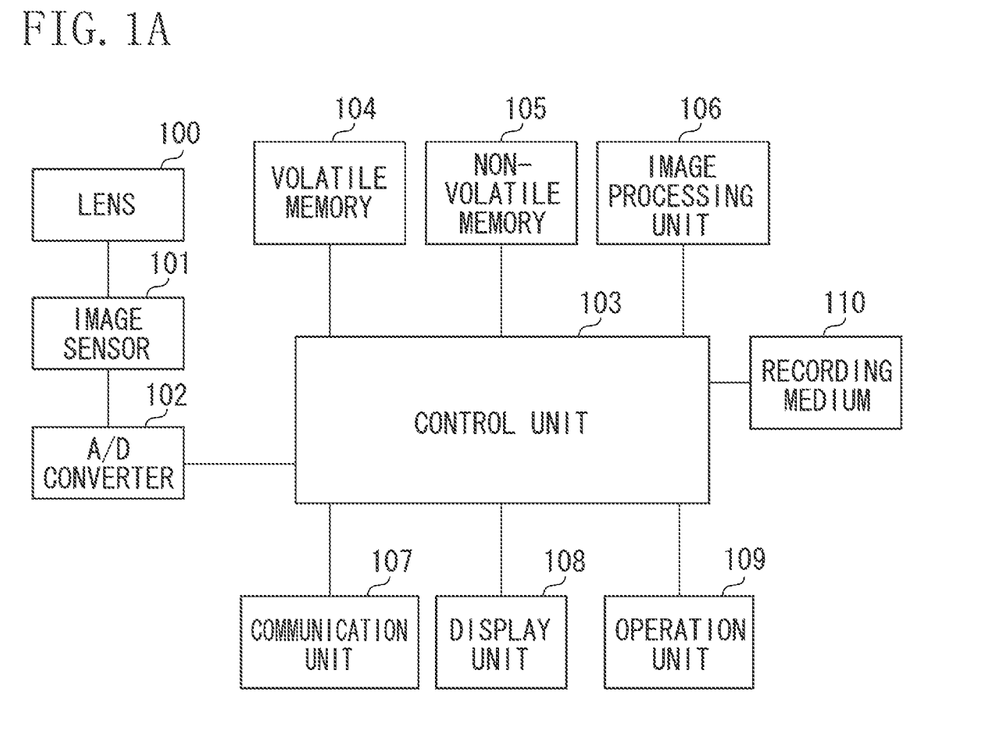
FIGS. 1A and 1B are diagrams illustrating a configuration of an image pickup apparatus according to the first exemplary embodiment.

FIG. 1A is a block diagram illustrating an image pickup apparatus 111 according to an exemplary embodiment. Examples of the image pickup apparatus 111 include a compact digital camera, a single-lens reflex camera, and a mirrorless camera. The present disclosure can also be applied to a camera-equipped smartphone, which is one type of cellular phone, a camera-equipped tablet device, and cameras used for industrial and medical uses.

The configuration of the image pickup apparatus 111 illustrated in FIG. 1A will be described below. Examples of the type of an image-capturing lens 100 include a fixed focal length lens and a zoom lens. The image-capturing lens 100 can be integrally formed with the image pickup apparatus 111, or can be an exchangeable lens. As an image sensor 101, a charge-coupled device (CCD) sensor, a complementary metal oxide semiconductor (CMOS) sensor, or the like is used. The image sensor 101 converts an object image formed by the image-capturing lens 100 into an electrical signal. An analog/digital (A/D) converter 102 converts an analog output signal from the image sensor 101 into a digital signal.

A control unit 103 controls the overall operation of the image pickup apparatus 111, such as control for each component and data processing, based on input signals from each unit or control programs. Examples of the control include image capture control, recording control, operation control, display control, and communication control. For example, when the control unit 103 detects that an image capture instruction button 116 is pressed, the control unit 103 performs a control operation for carrying out a still image capture sequence, and also performs a quick review display control for confirming a captured image, and a write control for writing data into a recording medium 110. During transfer of a captured image as described below, selection of an image as a transfer target, management of a transfer status for each image, and the like are carried out in the control operations of the control unit 103.

A volatile memory 104 temporarily holds image data converted into a digital signal by the A/D converter 102, variables used for various processing, and the like.

A non-volatile memory 105 stores various execution programs for the image pickup apparatus 111 that are executed by the control unit 103, various setting values in the image pickup apparatus 111, and the like.

An image processing unit 106 performs image processing on a captured image. The image processing unit 106 cooperates with the control unit 103 to generate a live view image for confirming a composition and focus during image capturing.

A communication unit 107 is an interface including a chip and an antenna for communication. The transmission method is not particularly limited. For example, a wired local area network (LAN), wireless LAN, Bluetooth®, 3G, or Long Term Evolution (LTE) can be used. The communication method in an application layer is also not particularly limited. In the present exemplary embodiment, a file transfer protocol (FTP) is used. The communication unit 107 can be built in the image pickup apparatus 111, or can be configured as a detachable transmitter. In other words, the image pickup apparatus 111 can include any configuration as long as the image pickup apparatus 111 includes an interface for connecting with the communication unit 107.

A display unit 108 performs, for example, display of a menu, reproduction of recorded images, and display of a live view image.

An operation unit 109 performs an operation on an object displayed on the display unit 108. As the operation unit 109, a key operation, a touch panel integrated with the display unit 108, or the like can be used. The configuration of the operation unit 109 according to the present exemplary embodiment will be described in detail below.

As the recording medium 110, a detachable memory card, a built-in flash memory, or the like can be used. The non-volatile memory 105 can function as the recording medium 110.

Each of the components described above need not necessarily correspond to one piece of hardware. A plurality of pieces of hardware can share processing and function as one unit as a whole, or one piece of hardware can have a plurality of roles.

<Configuration of Operation Unit of Image Pickup Apparatus>

Figure 1B:
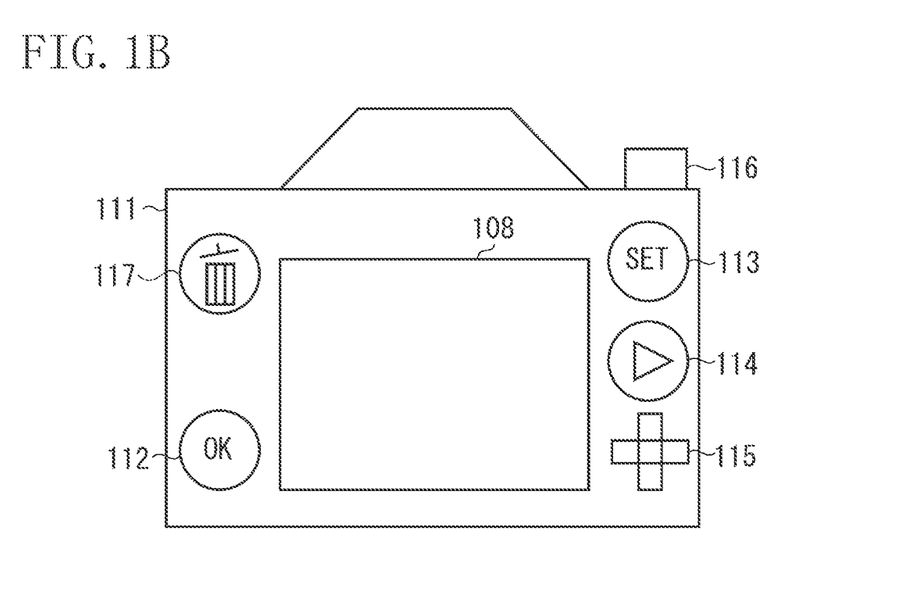

The operation unit 109 will now be described. FIG. 1B is a rear view illustrating the image pickup apparatus 111 according to the present exemplary embodiment. An OK button 112 is used to enter an instruction. The OK button 112 is assumed to be used as a confirmation button for implementing some processing, such as deletion of an image, after obtaining a confirmation from a user without fail. A SET button 113 is assumed to be used to display a setting menu, or select an item in the menu. When the control unit 103 detects pressing of a reproduction button 114, the control unit 103 reads out an image stored in the recording medium 110, temporarily holds the image in the volatile memory 104, and displays the image on the display unit 108. A multicontroller 115 is used to, for example, operate a menu cursor, or feed images to be reproduced. When the control unit 103 detects pressing of the image capture instruction button 116, the control unit 103 starts an image capture sequence.

When an image deletion button 117 is pressed during reproduction of an image, image deletion processing is performed by determining whether to delete the selected image or delete all images.

<Configuration of System>

Figure 2:
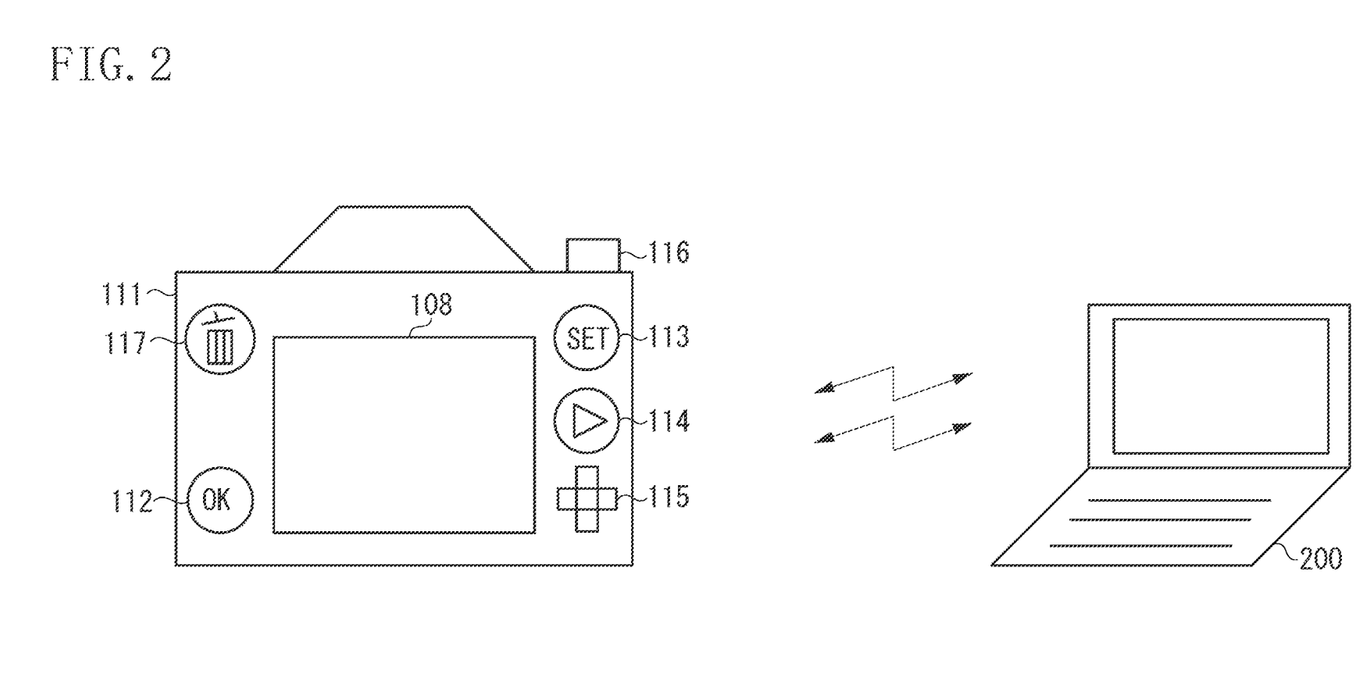
FIG. 2 is a diagram illustrating a system configuration according to the first exemplary embodiment.

FIG. 2 is a system configuration diagram according to an exemplary embodiment. The system according to the present exemplary embodiment includes the image pickup apparatus 111 and an information device 200. The image pickup apparatus 111 and the information device 200 can establish a communication and transferring image data therebetween. The communication method is not particularly limited. For example, the image pickup apparatus 111 and the information device 200 can directly communicate with each other using a wired LAN, a wireless LAN, a USB, or the like, or can communicate with each other via a network, such as an intranet or the Internet. In the present exemplary embodiment, a wireless LAN is used. As the information device 200, for example, a terminal such as a personal computer (PC) or a smartphone can be used. A server that is prepared through a network can also be used.

A use case assumed in the present exemplary embodiment will now be described. In the present exemplary embodiment, an image transfer using the FTP in on-site reporting activities is assumed as an example of the use case. In coverage activities, a speedy report performance for rapidly transmitting captured images to a broadcast station and a publishing company is required. Particularly in a big event, such as the Olympics, it is assumed that an operator who processes the captured images can be different from a photographer who captured the images. Accordingly, there is a need for transferring the captured images as rapidly as possible to the operator who processes the images. An improvement in a continuous image sensing and the like of an image pickup apparatus enables capturing of a large number of images at once. Under such circumstances, a function for rapidly and simply selecting and transferring images to be transferred is important.

In the present exemplary embodiment, the information device 200 functions as an FTP server and includes a function for automatically transferring images obtained by image capturing, and a function for designating, as the transfer target, images by performing a predetermined operation on a reproduced image, and automatically starting the transfer when the information device 200 is put into a communication enabled state. The function for selecting an image as the transfer target and transferring the selected image will be described below.

<Specifying Transfer Target>

Figure 3A:
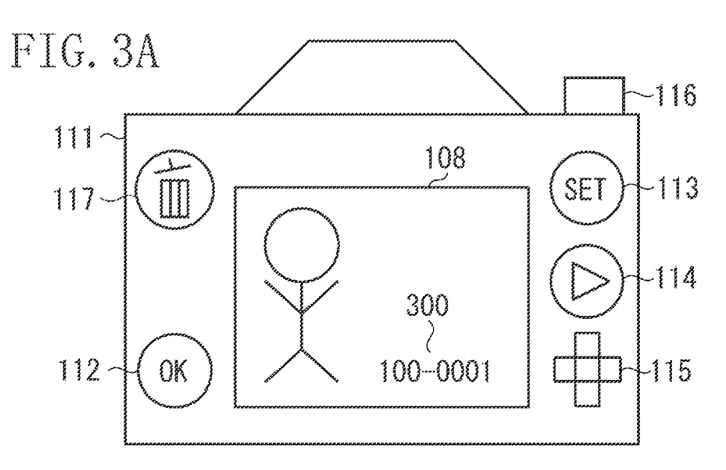
FIGS. 3A, 3B, 3C, 3D, 3E, 3F, and 3G are diagrams each illustrating an example of a display screen of the image pickup apparatus according to the first exemplary embodiment.

When pressing of the reproduction button 114 is detected, the images stored in the recording medium 110 are read out and displayed on the display unit 108. FIG. 3A illustrates an example in which one image is displayed in the image pickup apparatus 111. A file name 300 of the image being currently displayed is also displayed on the screen illustrated in FIG. 3A.

Figure 3B:
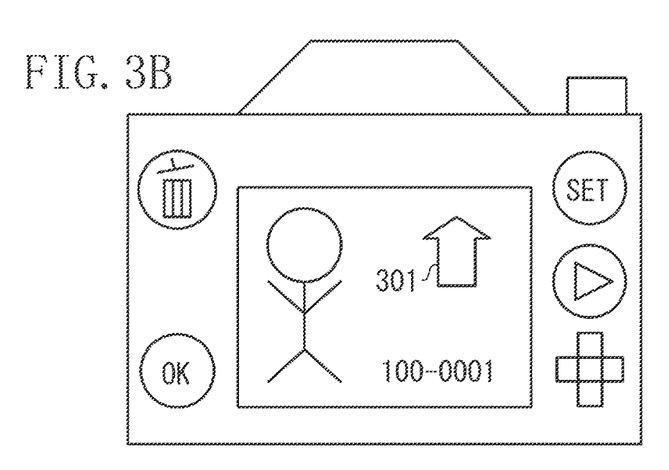

Next, a method for setting the image being currently displayed as the transfer target in the state illustrated in FIG. 3A will be described. In the present exemplary embodiment, when the user presses the OK button 112 and the SET button 113 simultaneously during display of the image, the control unit 103 manages the image being currently displayed as a transfer target image (specifies the image as the transfer target). A specific management method will be described below. FIG. 3B illustrates an example of the screen when the OK button 112 and the SET button 113 are simultaneously pressed in the state illustrated in FIG. 3A. Referring to FIG. 3B, a transfer target icon 301 is displayed in a superimposed manner so the user can identify the image being displayed as the transfer target. The user's operation enables automatic transfer of the transfer target image at a timing when a communication between the image pickup apparatus 111 and the information device 200 is established. The OK button 112 and the SET button 113 are simultaneously pressed to specify the transfer target. This is because time and labor for performing the menu selection operation and the like are saved in consideration of the need for rapidly transmitting images on-site. When the OK button 112 and the SET button 113 are simultaneously pressed in the state where the transfer target image is designated as illustrated in FIG. 3B, the image being currently displayed is excluded from the transfer target. In other words, pressing of both the OK button 112 and the SET button 113 functions as a toggle button for switching whether to set the image as the transfer target.

Figure 3C:
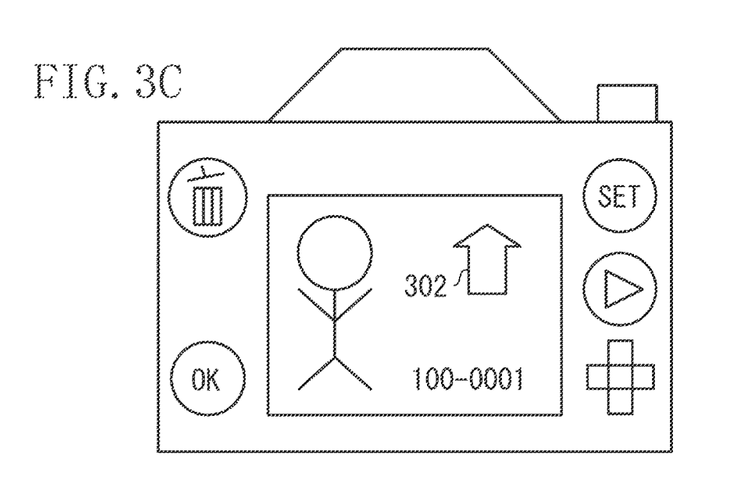

FIG. 3C illustrates an example of a screen display when the displayed image is being transferred. An icon 302 indicates that the displayed image is being transferred, and the arrow of the icon is displayed in dotted line. In addition, various display modes can be used as long as a change in status can be presented to the user by, for example, changing the color of the icon. The same is also applied to icons described below.

Figure 3D:
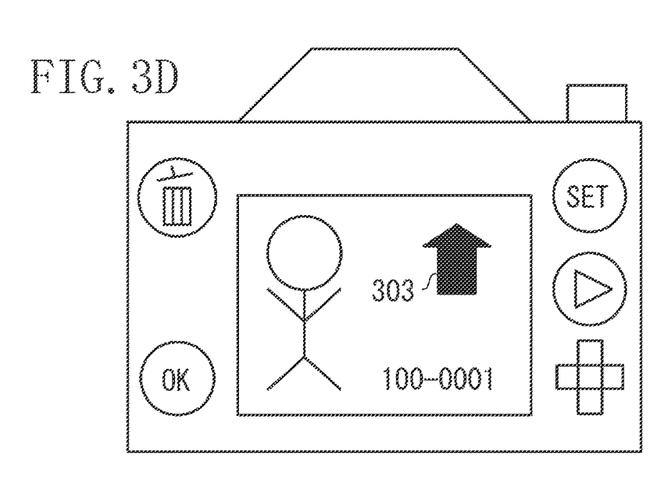

FIG. 3D illustrates a state in which the transfer of the image being displayed is complete. On this screen, an icon 303 indicating that the transfer is complete is displayed.

Figure 3E:
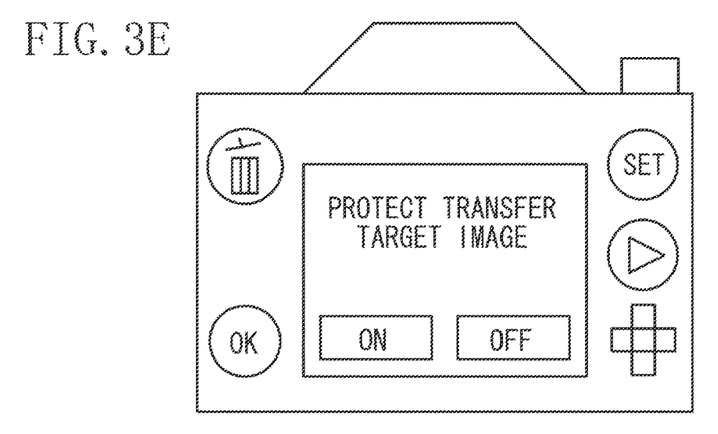

The image pickup apparatus 111 according to the present exemplary embodiment includes a function for setting a protect attribute for an image specified as the transfer target to prevent deletion of images that are not yet transferred. Various methods can be used as the method for setting the protect attribute, as long as information that enables the image pickup apparatus 111 to recognize a protected state is given to an image in any form. For example, information indicating the protect attribute as metadata for an image, or a table or the like for associating the information indicating the protect attribute with image information can be prepared. The phrase "set to the protect attribute" can hereinafter be simply referred to as "protected". The image pickup apparatus 111 controls the images set to the protect attribute to be prevented from being deleted by a normal deletion operation. As another method, control images can be prevented from being deleted without a user's special acknowledgment operation. Restricting the deletion of images as described above can prevent a situation in which images not yet transferred are accidentally deleted. It is desirable that the protect attribute of the image that is set to the protect attribute because the image selected as the transfer target be released after the transfer of the image is completed. Whether to use this function is determined by the user. Accordingly, it is desirable to display the screen as illustrated in FIG. 3E to cause the user to select, in advance, whether to activate the protect setting of the transfer target image or deactivate the protect setting.

Figure 3F:
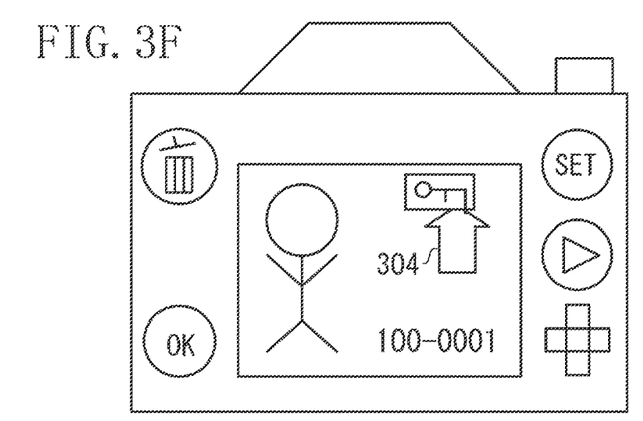

FIG. 3F illustrates an example of the screen when the protect setting of the transfer target image is activated. An icon 304 indicates that the image being displayed is set as the transfer target and at the same time the protect attribute is set, and thus the image cannot be deleted.

<Management of Transfer Target Image>

Next, management of a transfer target image will be described. The image pickup apparatus 111 according to the present exemplary embodiment manages each transfer target image using a list called a transfer management list. The transfer management list is stored in the non-volatile memory 105 or the recording medium 110 as, for example, a text file or a database file. During use, the transfer management list is loaded into the volatile memory 104 and processed by the control unit 103. This processing will be described in detail below with reference to FIGS. 4A, 4B, 4C, 4D, 4E, 4F, 4G, and 4H. The present exemplary embodiment illustrates an example in which three images IMG_0001, IMG_0002, and IMG_0003 are recorded.

Figure 4A:
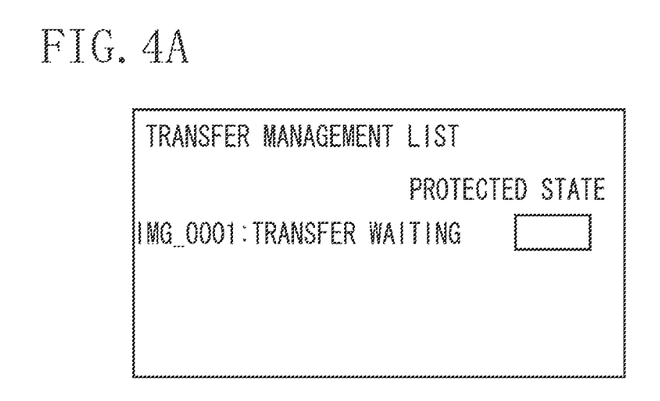
FIGS. 4A, 4B, 4C, 4D, 4E, 4F, 4G, and 4H are diagrams each illustrating a transfer management list according to the first exemplary embodiment.

First, assume that the image IMG_0001 is displayed on the screen illustrated in FIG. 3A of the display unit 108. In this state, when pressing of both the OK button 112 and the SET button 113 is detected, as illustrated in FIG. 3B, the image IMG_0001 is set as the transfer target. In this case, the control unit 103 adds the image IMG_0001 to the transfer management list. FIG. 4A illustrates this example. In the example illustrated in FIG. 4A, the image IMG_0001 is added to the transfer management list and the transfer status is set to a "transfer waiting" state.

Figure 4B:
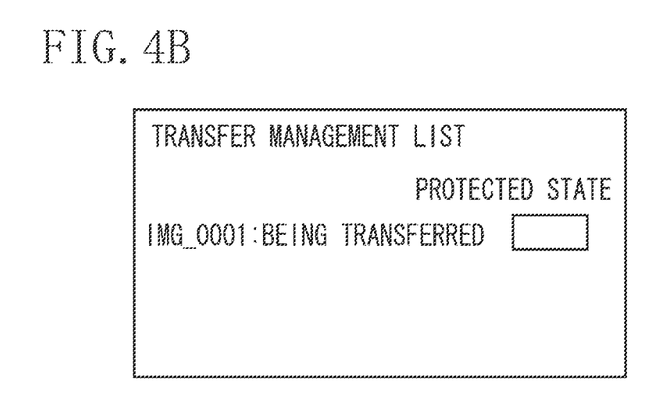

Next, as illustrated in FIG. 3C, when the IMG_0001 is being transferred, the transfer status of the image IMG_0001 in the transfer management list is updated with "being transferred" as illustrated in FIG. 4B.

Figure 4C:
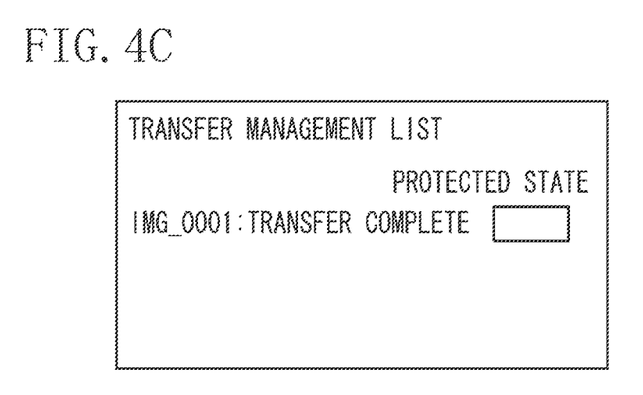

As illustrated in FIG. 3D, when the transfer of the image IMG_0001 is complete, the transfer status of the image IMG_0001 in the transfer management list is updated with "transfer complete" as illustrated in FIG. 4C.

Figure 4D:
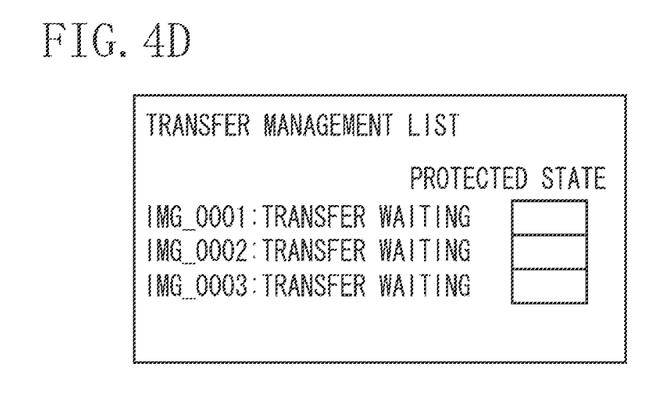

The above exemplary embodiment illustrates the case where one image is selected and the transfer state of the image is sequentially updated with "being transferred" and "transfer complete". However, a plurality of images can be selected as the transfer target. In such a case, as illustrated in FIG. 4D, information about the plurality of images is added to the transfer management list and the transfer status of each of the images is updated.

Next, a case where a transfer target image is set to the protect attribute on the screen illustrated in FIG. 3E will be described.

Figure 4E:
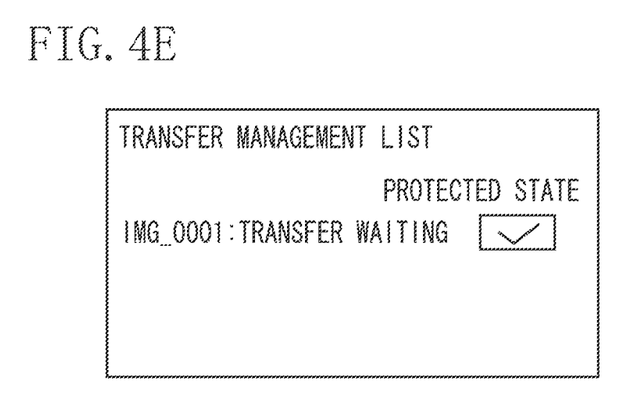
Figure 4F:
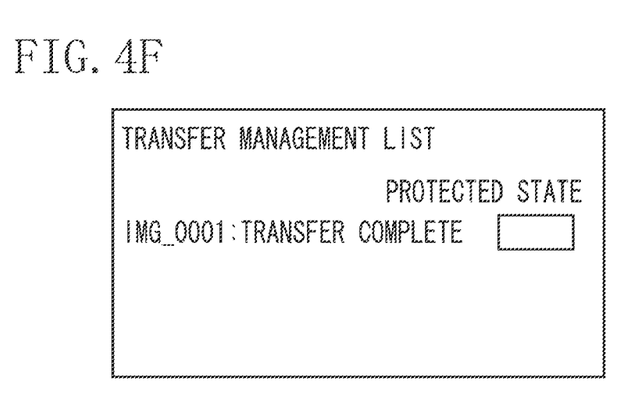

Like in the case of FIG. 4A, when pressing of both the OK button 112 and the SET button 113 is detected in a state where the image IMG_0001 is displayed on the display unit 108, as illustrated in FIG. 4E, the image IMG_0001 is added to the transfer management list. In this case, the protect attribute is automatically set to the image IMG_0001, so that a flag indicating a "protected state" in the transfer management list is turned on. This configuration enables management of the transfer status and the protected state in the transfer management list.

When the transfer of the image IMG_0001 is complete, the transfer status of the image IMG_0001 in the transfer management is updated with "transfer complete" as illustrated in FIG. 4C. In the present exemplary embodiment, the protect attribute of the image that has been transferred is automatically released, so that the flag indicating the "protected state" in the transfer management list is also turned off (as a result, a state that is the same as the state illustrated in FIG. 4C is obtained).

Next, a case where a transfer target image is set to the protect attribute on the screen illustrated in FIG. 3E in a state where the transfer target image was previously registered in the transfer management list.

Figure 4G:
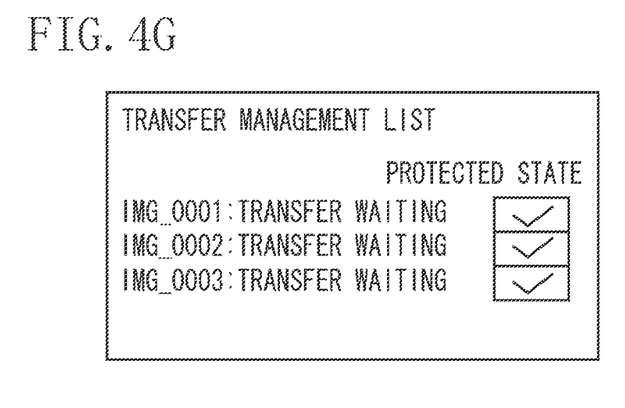

For example, as illustrated in FIG. 4D, when the images IMG_0001 to IMG_0003 are set on the screen illustrated in FIG. 3E in a state where the images are registered in the transfer management list, the transfer management list is obtained as illustrated in FIG. 4G. The protect attribute is also automatically given to the images previously set as the transfer target before the images are set on the screen illustrated in FIG. 3E.

Figure 4H:
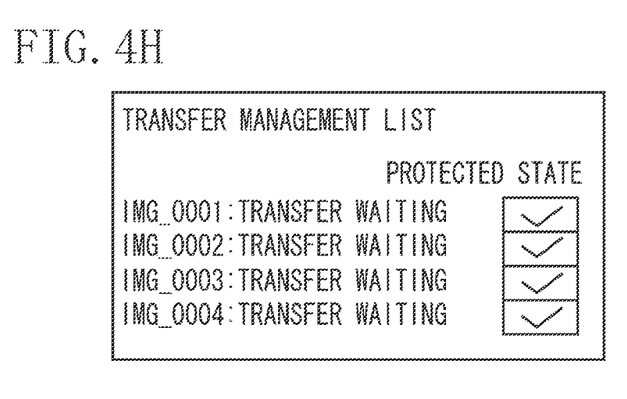

When an image IMG_0004 is newly specified as the transfer target from the state illustrated in FIG. 4G, the transfer management list is obtained as illustrated in FIG. 4H. The protect attribute is also given to the newly specified transfer target image IMG_0004, so that a flag indicating the "protected state" of the image IMG_0004 is turned on as illustrated in FIG. 4H.

An outline of the method for selecting an image to be reproduced and setting the image as the transfer target has been described above. Processing for automatically transferring images obtained by image capturing will now be described. Whether to automatically transfer images after image capturing is preliminarily set on a menu or the like. In a case where the automatic transfer after image capturing is set, an image obtained by image capturing is added to the transfer management list upon acquisition of the image by image capturing. With this configuration, the automatic transfer function after image capturing can be implemented.

<Processing for Transfer Management List>

Figure 5A:
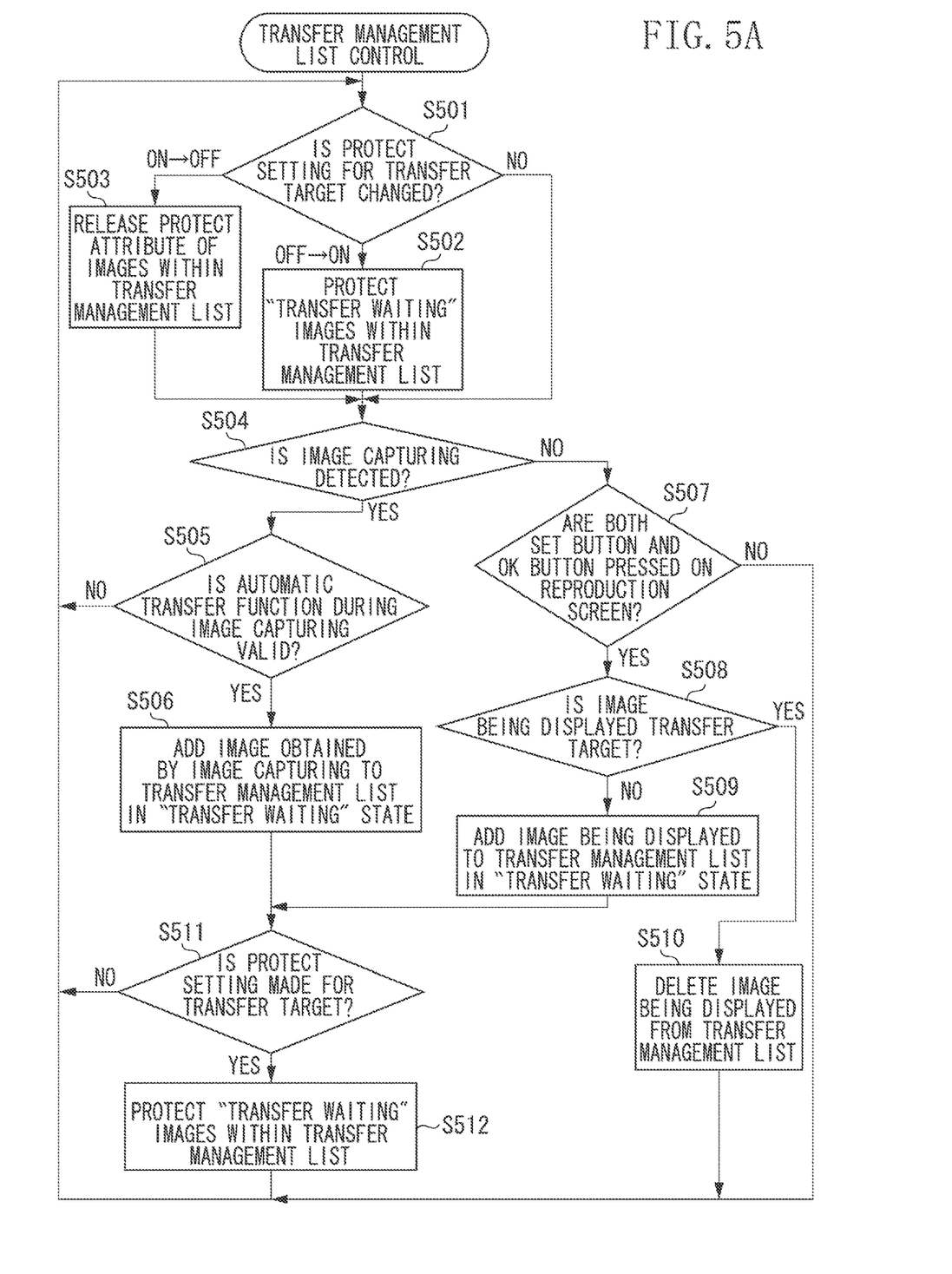
FIGS. 5A and 5B are flowcharts illustrating an operation of the image pickup apparatus according to the first exemplary embodiment.
Figure 5B:
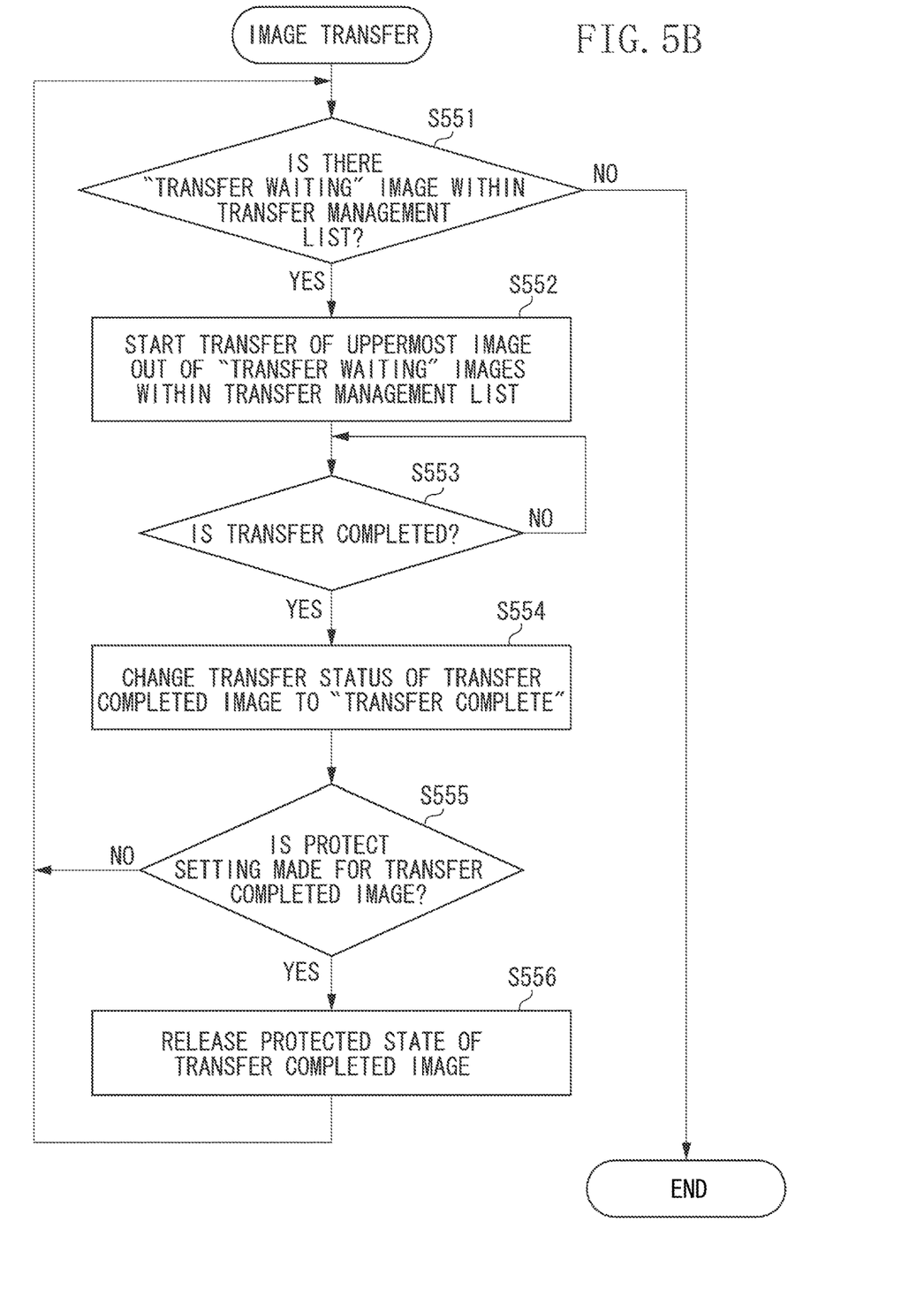

FIG. 5A is a flowchart illustrating processing for controlling the transfer management list in the image pickup apparatus 111 according to the present exemplary embodiment. Processing illustrated in flowcharts of FIGS. 5A and 5B is implemented such that the control unit 103 controls each unit of the image pickup apparatus 111 based on various input signals or programs. The flowchart of FIG. 5A is started, for example, at a timing when the power supply is turned on, or when a transfer mode is shifted to an FTP transfer mode by operating a menu.

First, in step S501, the control unit 103 determines whether the setting whether to protect the transfer target image is changed on the screen illustrated in FIG. 3E. If the setting is not changed (NO in step S501), the processing proceeds to step S504. If the protect setting is changed from "OFF" state to "ON" state, the processing proceeds to step S502. If the protect setting is changed from "ON" state to "OFF" state, the processing proceeds to step S503.

First, the case where the processing proceeds to step S502 will be described. In step S502, the control unit 103 checks the transfer management list, and if there is an image in a state of "transfer waiting", the control unit 103 turns on the flag indicating the "protected state" of the image and sets the protect attribute to the corresponding image. With this configuration, the protect attribute can also be set to the image already registered as the transfer target. If there is no image in the state of "transfer waiting" in the transfer management list, the processing of step S502 is not carried out.

In step S504, the control unit 103 determines whether image capturing is carried out. If it is determined that image capturing is carried out (YES in step S504), the processing proceeds to step S505. If it is determined that image capturing is not carried out (NO in step S504), the processing proceeds to step S507.

First, the case where the processing proceeds to step S505 will be described. In step S505, the control unit 103 determines whether the function for automatically transmitting the captured image is valid. If it is determined that the function is valid (YES in step S505), the processing proceeds to step S506. If it is determined that the function is not valid (NO in step S505), the processing returns to step S501.

In step S507, the control unit 103 adds and registers the image obtained by image capturing detected in step S504 in the transfer management list, and the processing proceeds to step S511. At the time of registration, the transfer status is set to "transfer waiting".

Next, the case where the processing proceeds to step S507 from step S504 will be described. In step S507, the control unit 103 determines whether the OK button 112 and the SET button 113 are simultaneously pressed on the screen on which one image is displayed. If it is determined that the OK button 112 and the SET button 113 are simultaneously pressed (YES in step S507), the processing proceeds to step S508. If it is determined that the OK button 112 and the SET button 113 are not simultaneously pressed (NO in step S507), the processing returns to step S501. There are various methods for determining whether the OK button 112 and the SET button 113 are simultaneously pressed. For example, if the state in which the OK button 112 and the SET button 113 are simultaneously pressed occurs for only a short period of time, or if the state continues for a certain period of time, it is determined that the OK button 112 and the SET button 113 are simultaneously pressed. However, the moment when the two buttons are pressed need not be necessarily be simultaneous.

In step S508, the control unit 103 checks the transfer management list and determines whether the image being currently displayed is the transfer target. The term "transfer target" refers an image in the state of "transfer waiting" or "being transferred" in the transfer management list. An image in the state of "transfer complete" is not determined to be the transfer target in step S508. If it is determined that the image is not the transfer target (NO in step S508), the processing proceeds to step S509. If it is determined that the image is the transfer target (YES in step S508), the processing proceeds to step S510.

When the processing proceeds to step S509, it is determined that the OK button 112 and the SET button 113 are simultaneously pressed for the image that is being displayed and is not the transfer target. Accordingly, in step S509, the control unit 103 adds and registers the image being displayed in the transfer management list, and the processing proceeds to step S511. At the time of registration, the transfer status is set to "transfer waiting". In the examples illustrated in FIGS. 4A to 4H, an image to be newly added is added to the bottom of the list. In other words, in the transfer management lists illustrated in FIGS. 4A to 4H, the transfer target images are listed in the order of registration.

When the processing proceeds to step S510, it is determined that the OK button 112 and the SET button 113 are simultaneously pressed for the image that is being displayed and is the transfer target. Accordingly, in step S510, the control unit 103 deletes the image being displayed from the transfer management list, and the processing returns to step S501.

In step S511, the control unit 103 determines whether the protect setting for the transfer target image is made using the screen illustrated in FIG. 3E. If it is determined that the setting is made (YES in step S511), the processing proceeds to step S512. If it is determined that the setting is not made (NO in step S511), the processing returns to step S501.

In step S512, the control unit 103 turns on the turned-off "protected state" flags of the images in the state of "transfer waiting" in the transfer management list. The protect attribute is set to the corresponding image. In step S512, it is intended that the protect attribute is set to the image newly added in steps S506 and S509. In other words, in this processing flow, the protect attribute is set in step S502 to the image previously designated as the transfer target, and the protect attribute is set in step S512 to the image newly designated as the transfer target. After the processing of step S512, the processing returns to step S501.

Referring again to step S501, the case where the processing proceeds to step S503 from step S501 will be described. The case where the processing proceeds to step S503 corresponds to the case where the protect setting for the transfer target image is changed from "ON" state to "OFF" state on the screen illustrated in FIG. 3E.

In step S503, the control unit 103 checks the transfer management list, and if the "protected state" flag is turned on, the control unit 103 turns off the flag and releases the protect attribute of the corresponding image. If there is no image whose "protected state" flag is turned on in the transfer management list, the processing of step S503 is not carried out.

The processing for controlling the transfer management list has been described above. Processing for actual image transfer will be described below.

<Processing for Image Transfer>

FIG. 5B is a flowchart illustrating processing for image transfer control in the image pickup apparatus 111 according to the present exemplary embodiment. The flowchart illustrated in FIG. 5B is executed at a timing when the FTP transfer is activated.

First, in step S551, the control unit 103 checks the transfer management list and determines whether there is an image in the state of "transfer waiting". If it is determined that there is an image in the state of "transfer waiting" (YES in step S551), the processing proceeds to step S552. If it is determined that there is no image in the state of "transfer waiting" (NO in step S551), it is determined that there is no transfer target image, and the processing is terminated.

In step S552, the control unit 103 starts FTP transfer processing for an uppermost image in the transfer management list from among the images in the state of "transfer waiting" within the transfer management list. In the transfer management lists illustrated in FIGS. 4A to 4H, assume that an image in an upper part of the list is a higher-order image. When the FTP transfer processing is started, the image pickup apparatus 111 first attempts to connect to the FTP server that is set in advance. When the connection is established, or when the connection is already established, the transfer of images to the FTP server to be connected is started.

In step S553, the control unit 103 determines whether the transmission of images started to be transferred in step S552 is complete. If it is determined that the transmission is complete (YES in step S553), the processing proceeds to step S554. If is determined that the transmission is not complete (NO in step S553), the processing is repeated. In addition, various error processing, such as termination of processing when the transfer is not complete after a lapse of a certain period of time, can also be provided.

In step S554, the control unit 103 changes the transfer status to "transfer complete" in the transfer management list of images that have been transferred, and the processing proceeds to step S555.

In step S555, the control unit 103 checks the transfer management list and determines whether the "protected state" flag of each of the images that have been transferred in step S553 is turned on. If it is determined that the flag is turned on (YES in step S555), the processing proceeds to step S556. If it is determined that the flag is not turned on (NO in step S555), the processing returns to step S551.

In step S556, the control unit 103 turns off the "protected state" flag that is determined to be in the turned-on state in step S555, and releases the protect attribute of the corresponding image. With this configuration, the protect attribute of each of the transferred images can be released. After the processing of step S556, the processing returns to step S551.

When the processing returns to step S551, the transfer state of the upper most image out of the images in the state of "transfer waiting" is changed to "transfer complete" in step S554. Accordingly, the second highest order image is moved to the uppermost position, and the transfer processing for the image is started. In this manner, by repeating this flowchart, all images in the "transfer waiting" state are transferred.

The flowchart of FIG. 5A and the flowchart of FIG. 5B can be executed in parallel. Accordingly, the content of the transfer management list can be changed by the processing of FIG. 5A during execution of the flowchart of FIG. 5B. In the present exemplary embodiment, the flowchart of FIG. 5B is executed based on the content of the transfer management list at the time of checking.

Figure 3G:
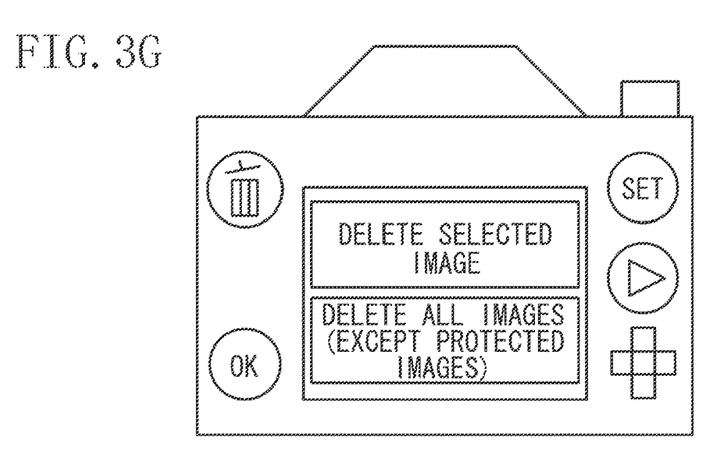

As described above, according to the flowcharts of FIGS. 5A and 5B, when the protect setting for the transfer target image is made on the screen illustrated in FIG. 3E, the protect attribute is set not only to the image newly designated as the transfer target after setting, but also to the images previously designated as the transfer target after setting. Thus, it is possible to prevent a situation in which the user accidentally deletes the transfer target image. Particularly when a function for "deleting images other than protected images" is provided, the usability of the present exemplary embodiment increased. A menu screen as illustrated in FIG. 3G will be described by way of example. If "delete a selected image" is selected on the screen illustrated in FIG. 3G, the image selected by the user in advance or after this selection is deleted. If "delete all images" is selected, all images other than the image for which the protect attribute is set are deleted. In particular, the latter case can be an issue. A use case can be assumed where the user activates the setting on the screen illustrated in FIG. 3E and then selects "delete all images" on the screen to leave only the transfer target image. This is useful method for, for example, a professional photographer who wishes to efficiently secure a free space in the recording medium 110 with a small number of operations. In this case, however, if the protect attribute is not set to each of the images previously designated as the transfer target, the images previously designated as the transfer target can be deleted based on the setting "delete all images". To prevent such a situation, in the present exemplary embodiment, when the protect setting for the transfer target image is made on the screen illustrated in FIG. 3E, the protect attribute is set not only to the image newly designated as the transfer target after the protect setting, but also to the images already designated as the transfer target before the protect setting.

Other Exemplary Embodiments

Figure 6A:
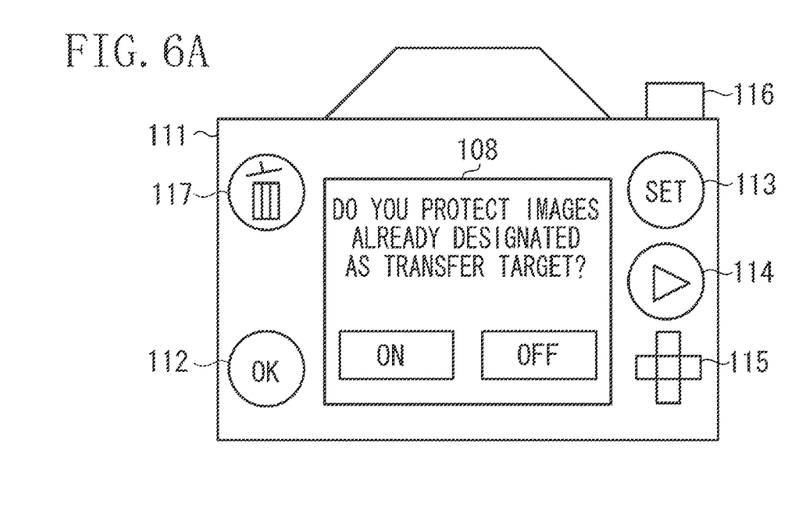
FIGS. 6A, 6B, and 6C are diagrams each illustrating an example of a display screen of an image pickup apparatus according to another exemplary embodiment.

In the first exemplary embodiment, when the setting is made for activating the protect attribute of the transfer target image in FIG. 3E, all transfer target images including the images previously designated as the transfer target before making the protect setting are protected. In another exemplary embodiment, it can be selected whether to protect all transfer target images like in the first exemplary embodiment, or to protect only the image designated as the transfer target after making the protect setting. For example, when "ON" is selected on the screen illustrated in FIG. 3E, the screen illustrated in FIG. 6A can be displayed.

Figure 6B:
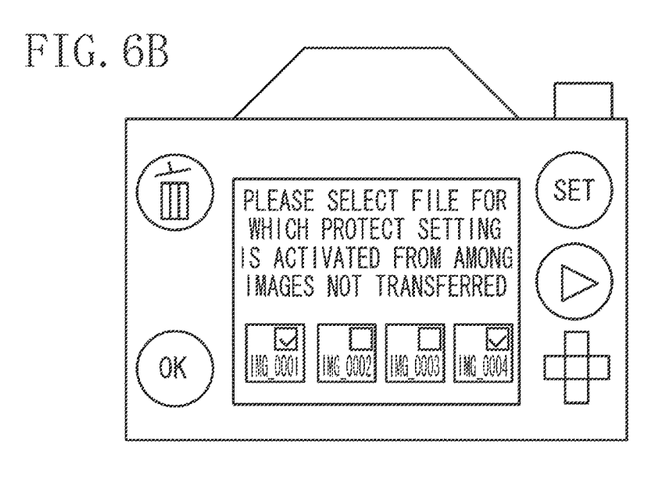

In a still another exemplary embodiment, it can be selected whether to arbitrarily protect selected images from among the images previously designated as the transfer target. In this case, for example, when "ON" is selected on the screen illustrated in FIG. 3E, the screen illustrated in FIG. 6B can be displayed.

Figure 6C:
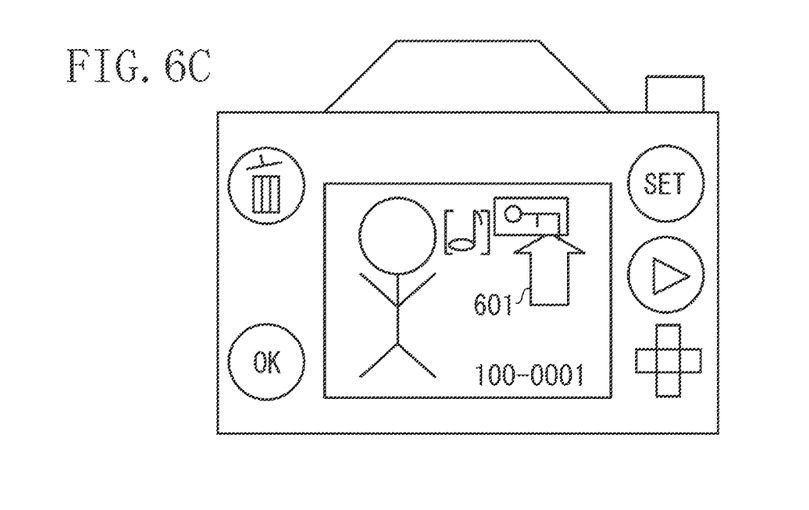

As still yet another exemplary embodiment, a case where audio data is associated with images will be described. Some so-called professional cameras include a built-in microphone and include a simple function for associating audio data with images to facilitate the classification of images. Assuming that such cameras are used, it is desirable to designate, as the transfer target, not only images, but also audio data associated with the images, and to set the protect attribute in combination. In this case, as illustrated in FIG. 6C, an icon 601 indicating that audio data is associated with images can be displayed.

In the exemplary embodiments described above, the image pickup apparatus 111 that transfers images assuming a use case for a photographer has been described by way of example. However, the present disclosure can also be applied to other use cases. For example, in a case where a reporter or the like wishes to rapidly transmit audio data recorded in a voice recorder, or in a case where measured data obtained in research or industry is transmitted to a remote location, the present disclosure can be applied to various communication apparatuses and contents.

The functions of the above exemplary embodiments can also be implemented by processing in which software (program) is supplied to a system or apparatus via a network or various types of recording media, and a computer (or a central processing unit (CPU), a micro processing unit (MPU), etc.) in the system or apparatus reads out the program and executes the program.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-031501, filed Feb. 22, 2017, which is hereby incorporated by reference herein in its entirety.

What is claimed is:

1. An image pickup apparatus that communicates with an external device, the image pickup apparatus comprising:
a display; and
a controller configured to perform operations comprising:
recording images in a recording medium;
specifying, as a transfer target, an image to be transferred to the external device from among the images recorded in the recording medium;
controlling transfer of the specified image to the external device;
displaying, on the display, a predetermined screen for inputting an instruction for restricting deletion of the image specified as the transfer target, wherein the controller displays, on the display, the predetermined screen for receiving input of the instruction even after the image is specified as the transfer target by the specifying; and
in a case where the instruction for restricting the deletion of the image specified as the transfer target is input using the predetermined screen, associating information for restricting the deletion with the image specified as the transfer target after the instruction is input, and also associating the information for restricting the deletion with images that are previously specified as the transfer target before the instruction is input but not associated with the information for restricting the deletion.

2. The image pickup apparatus according to claim 1, wherein, in a case where the image specified as the transfer target and associated with the information for restricting the deletion is transferred to the external device, the restricting releases the association between the image and the information for restricting the deletion.

3. The image pickup apparatus according to claim 1, wherein the operations further comprise deleting an image from the recording medium, and
wherein the deleting is capable of collectively deleting images not associated with the information for restricting the deletion.

4. The image pickup apparatus according to claim 3, wherein the deleting deletes an image selected by a user.

5. The image pickup apparatus according to claim 1, wherein the operations further comprise managing, using a list, the image specified as the transfer target.

6. The image pickup apparatus according to claim 5, wherein the list is used to manage the information for restricting the deletion, the information being associated with the image specified as the transfer target.

7. An image pickup apparatus that communicates with an external device, the image pickup apparatus comprising:
a display; and
a controller configured to perform operations comprising:
recording images in a recording medium;
specifying, as a transfer target, an image to be transferred to the external device from among the images recorded in the recording medium;
controlling transfer of the specified image to the external device; and
displaying, on the display, a predetermined screen for inputting an instruction for restricting deletion of the image specified as the transfer target, wherein the controller displays, on the display, the predetermined screen for receiving input of the instruction even after the image is specified as the transfer target by the specifying,
wherein, in a case where the instruction for restricting deletion of the image specified as the transfer target is input using the predetermined screen, the controller associates information for restricting the deletion with the image specified as the transfer target after the instruction is input, and
wherein, in a case where the instruction for restricting the deletion of the image specified as the transfer target is input via the predetermined screen and images previously specified as the transfer target before the instruction is input are present, the controller displays that the images that are previously specified as the transfer target before the instruction is input but not associated with the information for restricting the deletion are present.

8. The image pickup apparatus according to claim 7, wherein, in a case where the image specified as the transfer target and associated with the information for restricting the deletion is transferred to the external device, the restricting releases the association between the image and the information for restricting the deletion.

9. The image pickup apparatus according to claim 7, wherein the operations further comprise collectively deleting images not associated with the information for restricting the deletion.

10. The image pickup apparatus according to claim 9, wherein the operations further comprise deleting an image selected by a user.

11. The image pickup apparatus according to claim 7, wherein the operations further comprise managing, using a list, the image specified as the transfer target by the specifying.

12. The image pickup apparatus according to claim 11, wherein the list is used to manage the information for restricting the deletion, the information being associated with the image specified as the transfer target.

13. The image pickup apparatus according to claim 7, wherein, in the notification that the previously specified images are present, the controller displays a screen for selecting an image to be deleted from among the images previously specified as the transfer target before the instruction is input.

14. A control method of an image pickup apparatus that communicates with an external device, the control method comprising:
  recording images in a recording medium;
  specifying, as a transfer target, an image to be transferred to the external device from among the images recorded in the recording medium;
  transferring the specified image to the external device;
  displaying, on a display, a predetermined screen for inputting an instruction for restricting deletion of the image specified as the transfer target, wherein the predetermined screen for receiving input of the instruction is displayed, on the display, even after the image is specified as the transfer target by the specifying;
  associating, in a case where the instruction for restricting deletion of the image specified as the transfer target is input using the predetermined screen, information for restricting the deletion with the image specified as the transfer target after the instruction is input; and
  associating the information for restricting the deletion with images that are previously specified as the transfer target before the instruction is input but not associated with the information for restricting the deletion.

15. A control method of an image pickup apparatus that communicates with an external device, the control method comprising:
  recording images in a recording medium;
  specifying, as a transfer target, an image to be transferred to the external device from among the images recorded in the recording medium;
  transferring the specified image to the external device;
  displaying, on a display, a predetermined screen for inputting an instruction for restricting deletion of the image specified as the transfer target, wherein the predetermined screen for receiving input of the instruction is displayed, on the display, even after the image is specified as the transfer target by the specifying;
  associating, in a case where the instruction for restricting deletion of the image specified as the transfer target is input using the predetermined screen, information for restricting the deletion with the image specified as the transfer target after the instruction is input; and
  displaying, in a case where the instruction for restricting the deletion of the image specified as the transfer target is input via the predetermined screen and images already specified as the transfer target before the instruction is input are present, that the images that are previously specified as the transfer target before the instruction is input but not associated with the information for restricting the deletion are present.

16. A non-transitory computer-readable storage medium storing instructions that, when executed by a computer, cause the computer to perform a method for an image pickup apparatus that communicates with an external device, the method comprising:
  recording images in a recording medium;
  specifying, as a transfer target, an image to be transferred to the external device from among the images recorded in the recording medium;
  transferring the specified image to the external device;
  displaying, on a display, a predetermined screen for inputting an instruction for restricting deletion of the image specified as the transfer target, wherein the predetermined screen for receiving input of the instruction is displayed, on the display, even after the image is specified as the transfer target by the specifying;
  associating, in a case where the instruction for restricting deletion of the image specified as the transfer target is input via the predetermined screen, information for restricting the deletion with the image specified as the transfer target after the instruction is input; and
  associating the information for restricting the deletion with images that are previously specified as the transfer target before the instruction is input but not associated with the information for restricting the deletion.

17. A non-transitory computer-readable storage medium storing instructions that, when executed by a computer, cause the computer to perform a method for an image pickup apparatus that communicates with an external device, the method comprising:
  recording images in a recording medium;
  specifying, as a transfer target, an image to be transferred to the external device from among the images recorded in the recording medium;
  transferring the specified image to the external device;
  displaying, on a display, a predetermined screen for inputting an instruction for restricting deletion of the image specified as the transfer target, wherein the predetermined screen for receiving input of the instruction is displayed, on the display, even after the image is specified as the transfer target by the specifying;
  associating, in a case where the instruction for restricting deletion of the image specified as the transfer target is input via the predetermined screen, information for restricting the deletion with the image specified as the transfer target after the instruction is input; and
  displaying, in a case where the instruction for restricting the deletion of the image specified as the transfer target is input via the predetermined screen and images already specified as the transfer target before the instruction is input are present, that the images that are already specified as the transfer target before the instruction is input but not associated with the information for restricting the deletion are present.

* * * * *